Patented Dec. 28, 1948

2,457,539

UNITED STATES PATENT OFFICE 2,457,539

TREATMENT OF CHLOROMETHYL-SUBSTITUTED POLYSILOXANES

John R. Elliott and Robert H. Krieble, Schenectady, N. Y., assignors to General Electric Company, a corporation of New York No Drawing. Application May 5, 1945, Serial No. 592,291

5 Claims. (Cl. 260—46.5)

The present invention relates to the treatment of chloromethyl-substituted polysiloxanes. It is particularly concerned with the treatment of such compounds or mixtures thereof with an alkaline material to effect the removal of the silicon-bonded chloromethyl radicals. A more specific embodiment of the invention is the method of treating a compound containing a silicon-bonded chloromethyl group to effect the substitution of a hydroxyl group for said methyl group which comprises adding to said compound an alkaline material in an amount sufficient to obtain a pH of at least 9. Another specific embodiment of the invention is the method of polymerizing a polysiloxane containing silicon-bonded chloromethyl radicals which comprises heating said polysiloxane with a solution (aqueous solution) of sodium hydroxide.

Monochlorinated methyl groups attached to silicon have been found to be quite stable in the presence of heat and acidic reagents. Thus it has been possible to incorporate this group in polymeric siloxane structures where the polymerization or condensation reactions are carried out under acid or neutral conditions. Such products are described in detail in our copending application Serial No. 592,290, filed concurrently herewith and assigned to the same assignee as the present invention. However, the stability of the chlorinated methyl group attached to silicon decreases rapidly as the number of chlorines on the methyl group is increased. For example, polysiloxanes containing dichloromethyl and trichloromethyl groups attached to silicon are readily converted on heating to higher polymers accompanied by the loss of $CH_2Cl_2$ or $HCl_3$.

The present invention is based on the discovery that chlorinated methyl groups attached to silicon can be caused to undergo carbon-silicon fission by treatment with alkaline reagents with the formation of the corresponding chloromethane and silanol in accordance with the following equation:

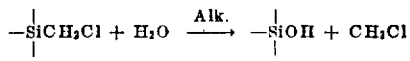

While the reaction is illustrated by the cleavage of a monochloromethyl group from silicon, the dichloromethyl and trichloromethyl silyl groups are also cleaved by alkaline agents with the formation of the corresponding chloromethane and silanol.

This carbon-silicon cleavage is unexpected in the light of the results of other investigations of α-chloro-alkyl silanes. For example, Ushakov and Itenberg, Zurnal Abshchei Khimii, 7, 2495 (1937) reported that triethyl-α-chloroethyl silane was not affected by boiling alcoholic NaOH but that in a sealed tube with 10% alcoholic KOH at 145° C. for 9 hours, the elements of HCl were removed to form triethyl vinyl silane in good yield. It has also been found that the C—Cl bond instead of the Si—C bond in α-chloropropyltrichlorosilane is readily hydrolyzed by 1.5 N alcoholic KOH at 80° C. In fact, the carbon-silicon fission of chlorinated methyl groups in the presence of alkaline reagents seems to be specific for these groups.

A particular advantage of the present invention is that it may be employed in the preparation of higher molecular weight polysiloxanes from polysiloxanes containing silicon-bonded chloromethyl radicals by the substitution of the easily condensible hydroxyl radicals for these chloromethyl radicals. Other advantages of the present invention will become apparent to those skilled in the art from the following illustrative examples:

Example 1

Dimethyl (dichloromethyl) chlorosilane was hydrolyzed by pouring into water and the sym-tetramethylbis (dichloromethyl) disiloxane was separated from the aqueous phase. This siloxane was treated with 40% aqueous potassium hydroxide. The reactants heated spontaneously and a gas identified as methylene chloride was evolved. The siloxane was converted to a highly viscous oil as the result of its polymerization to a high molecular weight through condensation of the silicon-bonded hydroxyl groups which replaced the chloromethyl groups.

Example 2

Methyldi-(chloromethyl) chlorosilane was hydrolyzed by pouring into water and the resulting sym-dimethyltetrabis (chloromethyl) disiloxane was separated from the aqueous phase. This material was treated with 40% aqueous potassium hydroxide and gently heated. Methyl chloride was evolved with the simultaneous formation of a methyl polysiloxane resinous or gel structure. Since there were two chloromethyl groups on each silicon of the disiloxane, the removal of these groups and the substitution of silicon-bonded hydroxyl groups therefor yielded a material capable of condensing to form a three-dimensional structure.

Example 3

Methyltrichloromethyldichlorosilane was hydrolyzed in water and the resulting oil was heated with 40% aqueous potassium hydroxide. During the course of the reaction, a non-aqueous distillate identified as chloroform was given off.

In the above examples a strongly alkaline material was used to effect the carbon-silicon fission of the chlorinated groups attached to silicon. However, weak bases such as ammonia, sodium carbonate, basic metal oxides and the organic salts of the basic metal oxides capable of creating mildly alkaline conditions in the reaction mixture will also effect the fission.

*Example 4*

Sym-tetramethylbis-(dichloromethyl) disiloxane was contacted with moist sodium carbonate in a distilling flask connected to an ice-cooled trap. On gentle warming methylene chloride was evolved and the oil in contact with the sodium carbonate became more viscous, indicating that condensation reactions resulting in the formation of higher molecular weight products were taking place as a result of the cleavage of the Si—C bond in the presence of water.

*Example 5*

Sym-tetramethylbis (dichloromethyl) disiloxane was placed in a distilling flask along with an equal volume of 1% aqueous sodium carbonate and a little n-butanol to increase the water-oil compatibility. On heating to the reflux temperature a gas identified as methylene chloride was evolved and was collected in an ice-cooled trap attached to the flask.

*Example 6*

Sym-tetramethylbis (dichloromethyl) disiloxane was contacted with solid lead oxide in a distilling flask leading to an ice-cooled receiver. A reaction started spontaneously. After a few minutes, gentle heat was applied and a distillate, methylene chloride, was collected in the trap.

*Example 7*

Sym-tetramethylbis (dichloromethyl) disiloxane was contacted with an oil-soluble form of a basic metal salt known as lead naphthenate. On gentle warming a gas, methylene chloride, was distilled from the reaction mass demonstrating that this alkaline reagent also effects the carbon-silicon fission of chlorinated methyl groups attached to silicon.

Since the chloromethyl and dichloromethyl silyl groups are not cleaved in the presence of acids, these groups can be incorporated in polysiloxane structures such as oils, rubbers and resins under non-alkaline polymerizing or condensing conditions. Once the desired polysiloxane structure is obtained, for example by use of acidic conditions, additional functionality can be introduced into the polymer through cleavage of the chlorinated methyl group by means of alkaline reagents. The relative number and position of the chloromethyl groups will determine the amount and the position of the new functionality. Thus if the chloromethyl groups are present in non-terminal positions in a long polysiloxane chain, their cleavage, followed by condensation of the resulting silanol groups, will lead to cross-linked structures. The number of cross-links can be controlled through the number of chloromethyl groups in the chains. Again the chloromethyl groups can be placed at the ends of a linear polysiloxane. After cleavage of these chloromethyl groups, the silanol groups formed at the ends of the chain can condense or be condensed to yield longer linear chains. Thus by means of the present invention a polysiloxane of intermediate molecular weight and containing chloromethyl groups in the desired portions can be made under acidic or at least non-alkaline conditions and then, by means of alkaline reagents, additional functionality in the form of Si—OH groups can be introduced and the polymer condensed to its final form by condensation of the new silanol groups.

The following examples illustrate a two-stage preparation of a silicone polymer in which the final product is a heat-stable silicone elastomer.

*Example 8*

Heptamethylchloromethylcyclotetrasiloxane was polymerized to a silicone gum by heating with 2.0% $FeCl_3.6H_2O$ as is described in our above-mentioned copending application. The silicone gum obtained by polymerization with the acidic reagent was completely soluble in toluene, thus indicating that no cleavage of chloromethyl groups had occurred. The gum was compounded on milling rolls with 1.0% of PbO and 200% $TiO_2$ (based on weight of gum) and a sheet formed therefrom by pressing in a sheet mold for 10 minutes at 150° C. Portions of the pressed sheet were then oven cured with the results set forth in the following table:

| Oven Temp., Degrees | Time, Hours | Shore Hardness | Tensile Strength, p. s. i. | Per cent Elong. |
|---|---|---|---|---|
| No cure | | 16 | 11 | 0 |
| 200 | 3 | 38 | 280 | 150 |
| 200 | 12 | 46 | 240 | 100 |
| 150 | 15 | 40 | 210 | 150 |

These data clearly show that vulcanizing (cross-linking) was taking place during the heating period. Cleavage of the chloromethyl groups brought about by the alkaline lead oxide introduced additional silanol groups into the linear molecules. The condensation of these silanols thus formed caused the vulcanization of the gum. Both the gum and the elastomer generally resembled the silicone gums or elastomers described and claimed in the copending application of Maynard C. Agens, Serial No. 526,473, filed March 14, 1944, now Patent No. 2,448,756, and assigned to the same assignee as the present invention.

While the invention has been described with particular reference to polysiloxanes containing chloromethyl and methyl groups, it is obvious that compounds containing silicon-bonded radicals other than the methyl radicals may also be treated in accordance with the present invention. Such compounds may contain ethyl, phenyl or other alkyl or aryl groups and can be prepared, for example, by hydrolysis of a mixture of a suitable chloromethyl halogenosilane and an ethyl or phenyl, or other hydrocarbon-substituted halogenosilane. Additional examples of such compounds and methods of preparing them are found in our above-identified application.

What we claim as new and desire to secure by Letters Patent of the United States, is:

1. In the process of treating a preformed methylpolysiloxane containing silicon-bonded chlorinated methyl groups thereby to obtain a methylpolysiloxane of higher molecular weight, the step which comprises effecting intimate contact between said polysiloxane and an aqueous alkaline solution having a pH of at least 9 whereby the said bond is cleaved and the corresponding chlorinated methane is formed, and allowing the resulting polysiloxane to condense to form a methylpolysiloxane of higher molecular weight than the starting methylpolysiloxane.

2. In the process of treating a methyldisiloxane containing a silicon-bonded chlorinated methyl group wherein neither silicon atom is attached to more than one chlorinated methyl radical, thereby to obtain a methylpolysiloxane having a higher molecular weight, the steps which comprise (1) bringing said disiloxane into intimate contact with an aqueous solution of an alkali-metal hydroxide whereby the said bond is cleaved and the corresponding chlorinated methane is formed, (2) heating the mixture obtained in (1) and allowing the resulting polysiloxane to condense to form a polysiloxane of higher molecular weight than the starting disiloxane.

3. In the process of treating a preformed methylpolysiloxane containing silicon-bonded chlorinated methyl radicals thereby to obtain a material of higher molecular weight, the step which comprises heating said methylpolysiloxane with an aqueous solution of sodium hydroxide whereby the bond between the individual silicon atoms and chlorinated methyl radicals is cleaved with the concomitant formation of the corresponding chlorinated methane, and allowing the resulting polysiloxane to condense to form a polysiloxane of higher molecular weight than the starting methylpolysiloxane.

4. In the process of treating a preformed methylpolysiloxane containing silicon-bonded chlorinated methyl groups thereby to obtain a methylpolysiloxane of higher molecular weight, the step which comprises effecting intimate contact between said polysiloxane and an aqueous potassium hydroxide solution having a pH of at least 9 whereby the said bond is cleaved and the corresponding chlorinated methane is formed, and allowing the resulting polysiloxane to condense to form a methylpolysiloxane of higher molecular weight than the starting methylpolysiloxane.

5. In the process of treating a preformed methylpolysiloxane containing silicon-bonded chlorinated methyl groups thereby to obtain a methylpolysiloxane of higher molecular weight, the step which comprises effecting intimate contact between said polysiloxane and an aqueous sodium carbonate solution having a pH of at least 9 whereby the said bond is cleaved and the corresponding chlorinated methane is formed, and allowing the resulting polysiloxane to condense to form a methylpolysiloxane of higher molecular weight than the starting methylpolysiloxane.

JOHN R. ELLIOTT.
ROBERT H. KRIEBLE.

REFERENCES CITED

The following references are of record in the file of this patent:

UNITED STATES PATENTS

| Number | Name | Date |
| --- | --- | --- |
| 2,377,689 | Hyde | June 5, 1945 |
| 2,384,384 | McGregor et al. | Sept. 4, 1945 |
| 2,389,807 | McGregor et al. | Nov. 27, 1945 |